(12) United States Patent
Kastner et al.

(10) Patent No.: US 10,816,041 B2
(45) Date of Patent: Oct. 27, 2020

(54) BELT PULLEY DECOUPLER

(71) Applicant: Schaeffler Technologies AG & Co. KG, Herzogenaurach (DE)

(72) Inventors: Michael Kastner, Erlangen (DE); Roland Arneth, Eggolsheim (DE); Christian Hauck, Altdorf (DE); Sebastian Pecher, Furth (DE); Andreas Gotz, Wilhelmsdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 152 days.

(21) Appl. No.: 15/774,117

(22) PCT Filed: Dec. 1, 2016

(86) PCT No.: PCT/DE2016/200572
§ 371 (c)(1),
(2) Date: May 7, 2018

(87) PCT Pub. No.: WO2017/097299
PCT Pub. Date: Jun. 15, 2017

(65) Prior Publication Data
US 2018/0328414 A1 Nov. 15, 2018

(30) Foreign Application Priority Data

Dec. 8, 2015 (DE) .......................... 10 2015 224 608

(51) Int. Cl.
*F16D 7/02* (2006.01)
*F16D 3/72* (2006.01)
(Continued)

(52) U.S. Cl.
CPC ............... *F16D 7/022* (2013.01); *F16D 3/52* (2013.01); *F16D 3/72* (2013.01); *F16D 13/76* (2013.01);
(Continued)

(58) Field of Classification Search
CPC .. F16H 55/36; F16H 2055/366; F16D 41/206; F16D 7/022; F02B 67/06
(Continued)

(56) References Cited

U.S. PATENT DOCUMENTS 1,766,585 A * 6/1930 Banfield, Jr. .......... D01H 1/241
474/197
1,948,816 A * 2/1934 Hollerith ............... F16C 33/103
474/91
(Continued)

FOREIGN PATENT DOCUMENTS

| CN | 102498307 | 6/2012 |
|---|---|---|
| CN | 102859233 | 1/2013 |

(Continued)

*Primary Examiner* — Henry Y Liu
(74) *Attorney, Agent, or Firm* — Volpe Koenig (57) ABSTRACT

A belt pulley decoupler is provided for transmitting drive torque from belts of an auxiliary unit belt drive to the shaft of one of the auxiliary units, including: a belt pulley, a hub secured to the shaft, and a series circuit arranged in the drive torque flow between the belt pulley and the hub and including a decoupler spring and a wrap-around band that extends in the direction of the rotational axis of the belt pulley decoupler and is arranged radially between the belt pulley and the decoupler spring. Both ends of the wrap-around band open out radially when the drive torque is transmitted, the first end of the wrap-around band is braced against the inner surface of a first sleeve rotationally fixed in the belt pulley, and the second end of the wrap-around band is braced against the inner surface of a second sleeve rotationally mounted in the first sleeve.

17 Claims, 5 Drawing Sheets

(51) Int. Cl.
*F16D 13/76* (2006.01)
*F16D 41/20* (2006.01)
*F16H 9/04* (2006.01)
*F16D 3/52* (2006.01)
*F16H 55/36* (2006.01)

(52) U.S. Cl.
CPC ............ *F16D 41/206* (2013.01); *F16H 9/04* (2013.01); *F16H 55/36* (2013.01); *F16H 2055/366* (2013.01)

(58) Field of Classification Search
USPC .......................................................... 474/70
See application file for complete search history.

(56) References Cited

U.S. PATENT DOCUMENTS

| | | | | |
|---|---|---|---|---|
| 2,516,829 | A * | 7/1950 | Reeves | F16H 55/56 474/45 |
| 4,002,081 | A * | 1/1977 | Schultz, Jr. | F16H 55/48 474/94 |
| 5,139,463 | A * | 8/1992 | Bytzek | F16D 3/52 474/69 |
| 5,722,909 | A * | 3/1998 | Thomey | F02B 67/06 474/87 |
| 6,083,130 | A * | 7/2000 | Mevissen | F16D 7/022 474/70 |
| 7,153,227 | B2 * | 12/2006 | Dell | F16H 55/36 474/70 |
| 7,591,357 | B2 * | 9/2009 | Antchak | F16D 41/206 192/41 S |
| 7,618,337 | B2 * | 11/2009 | Jansen | F02B 67/06 192/41 S |
| 7,708,661 | B2 * | 5/2010 | Pflug | F16F 15/123 192/104 B |
| 7,878,315 | B2 * | 2/2011 | Saito | F16D 41/206 192/107 T |
| 7,891,475 | B2 * | 2/2011 | Zhu | F16D 41/22 192/54.5 |
| 7,892,124 | B2 * | 2/2011 | Hodjat | F16D 3/02 192/212 |
| 7,975,821 | B2 * | 7/2011 | Antchak | F16D 41/206 192/55.1 |
| 8,047,920 | B2 * | 11/2011 | Jansen | F16D 7/022 464/60 |
| 8,313,400 | B2 * | 11/2012 | Serkh | F16H 55/36 464/89 |
| 9,033,832 | B1 * | 5/2015 | Serkh | F16H 55/36 474/70 |
| 9,068,608 | B2 | 6/2015 | Serkh et al. | |
| 9,175,753 | B2 | 11/2015 | Frankowski et al. | |
| 9,605,743 | B2 | 3/2017 | Michelotti | |
| 2004/0014540 | A1 * | 1/2004 | Dell | F16H 55/36 474/70 |
| 2004/0112700 | A1 * | 6/2004 | Liston | B23P 15/00 192/41 S |
| 2005/0250607 | A1 * | 11/2005 | Jansen | F02B 67/06 474/74 |
| 2015/0167816 | A1 * | 6/2015 | Li | F16H 55/36 474/166 |

FOREIGN PATENT DOCUMENTS

| | | |
|---|---|---|
| CN | 203413096 | 1/2014 |
| CN | 105008747 | 10/2015 |
| DE | 60318721 | 6/2008 |
| DE | 102009052611 | 5/2011 |
| DE | 102012006285 | 10/2013 |
| EP | 2894364 | 7/2015 |
| JP | 2003301860 | 10/2003 |
| WO | 2012061930 | 5/2012 |

* cited by examiner

Fig. 12

BELT PULLEY DECOUPLER

BACKGROUND

The invention relates to a belt pulley decoupler for transmitting the drive torque from belts of an auxiliary unit belt drive to the shaft of one of the auxiliary units, with:
a belt pulley,
a hub mounted on the shaft,
and a series circuit that is arranged in the flow of drive torque between the belt pulley and the hub and is made from a decoupler spring and a wrap-around band that extends in the direction of the rotational axis of the belt pulley decoupler and is arranged radially between the belt pulley and the decoupler spring.

Rotational oscillations and irregularities that are introduced by the crankshaft of an internal combustion engine into its auxiliary unit belt drive can be compensated in a known way by belt pulley decouplers that are usually known simply as decouplers and are typically formed as alternator belt pulleys. The wrap-around band is used as a one-way coupling that transmits, in the closed state, the drive torque from the belt pulley to the hub, wherein the elasticity of the decoupler spring connected in series to the wrap-around band smooths the rotational irregularities originating from the belt drive. For a delayed rotating belt pulley, the wrap-around band opens, wherein—then conversely—no significant torque can be transmitted from the hub to the belt pulley, so that the alternator shaft loaded with high mass inertia can overtake the belt pulley.

A belt pulley decoupler with wrap-around band arranged radially on the inside and decoupler spring arranged radially on the outside in the form of a helical torsion spring is known from DE 10 2009 052 611 A1.

A belt pulley decoupler according to the class with radially interchanged arrangement of the wrap-around band and helical torsion spring emerges, for example, from U.S. Pat. No. 8,047,920 B2.

SUMMARY

Starting from that document, the present invention is based on the objective of disclosing such a belt pulley decoupler in an alternative structural design.

The solution to this objective is given from one or more features of the invention. Accordingly, both ends of the wrap-around band should expand radially while transmitting the drive torque, wherein the first wrap-around band running in the flow of drive torque on the side of the belt pulley is tensioned against the inner lateral surface of a first sleeve that is rotationally locked in the belt pulley, and wherein the second wrap-around band running in the flow of drive torque on the side of the decoupler spring is tensioned against the inner lateral surface of a second sleeve that is supported so that it can rotate in the first sleeve.

Differently than in the prior art cited above, the belt pulley decoupler comprises two sleeves that are supported so that they can rotate one in the other and in which the wrap-around band expanding radially under load wraps around with both ends and transmits the drive torque. Consequently, the components coupled with the wrap-around band on the drive side and driven side have simple and economically producible contact geometries for the wrap-around band ends. In particular, the rotatable support of the second sleeve in the first sleeve prevents the indirect contact of the wrap-around band with the inner lateral surface of the belt pulley, so that a heat treatment increasing the wear resistance and/or surface coating of the belt pulley can be eliminated.

In the preferred design of a flank-less and consequently completely cylindrical wrap-around band, the inner lateral surfaces of the two sleeves are also completely cylindrical, so that the drive torque is transmitted exclusively through friction contact forces between the outer lateral surface of the wrap-around band and the inner lateral surface of the two sleeves.

Both sleeves can be economically producible sheet formed parts, wherein the first sleeve is preferably locked in rotation by an interference fit assembly in the belt pulley. The first sleeve can be provided with a first diameter step as an axial stop for the second sleeve and with a second diameter step as an axial stop for the wrap-around band. This sleeve geometry with two steps in diameter makes it possible for the inner diameter of the belt pulley to be produced economically (turned) essentially with no or at most with only small diameter steps.

For the assembly of the wrap-around band in the first sleeve, it can be preferred if the first sleeve is provided with circumferentially distributed openings for a mounting tool. This tool engages in the openings and reduces the outer diameter of the wrap-around band, in order to be able to introduce the wrap-around band with the lowest possible resistance axially over the first diameter step up to contact with the second diameter step in the first sleeve. The openings are arranged in the rotating bearing section for the second sleeve and preferably close to the first diameter step.

BRIEF DESCRIPTION OF THE DRAWINGS

Additional features of the invention are given from the following description and from the drawings in which an embodiment and alternative structural details of a belt pulley decoupler according to the invention are shown for the alternator arranged in the auxiliary unit belt drive of an internal combustion engine. Shown are.

DETAILED DESCRIPTION

Figure 1:
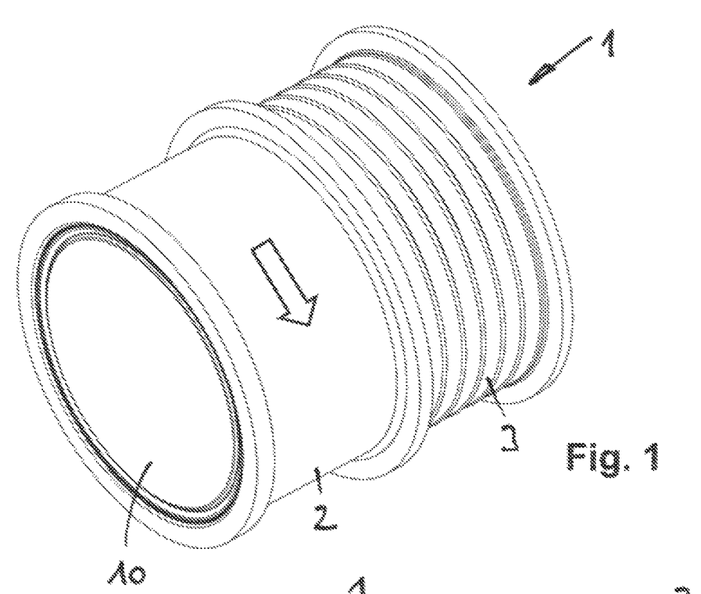
FIG. 1 the belt pulley decoupler in a perspective overall representation.
Figure 2:
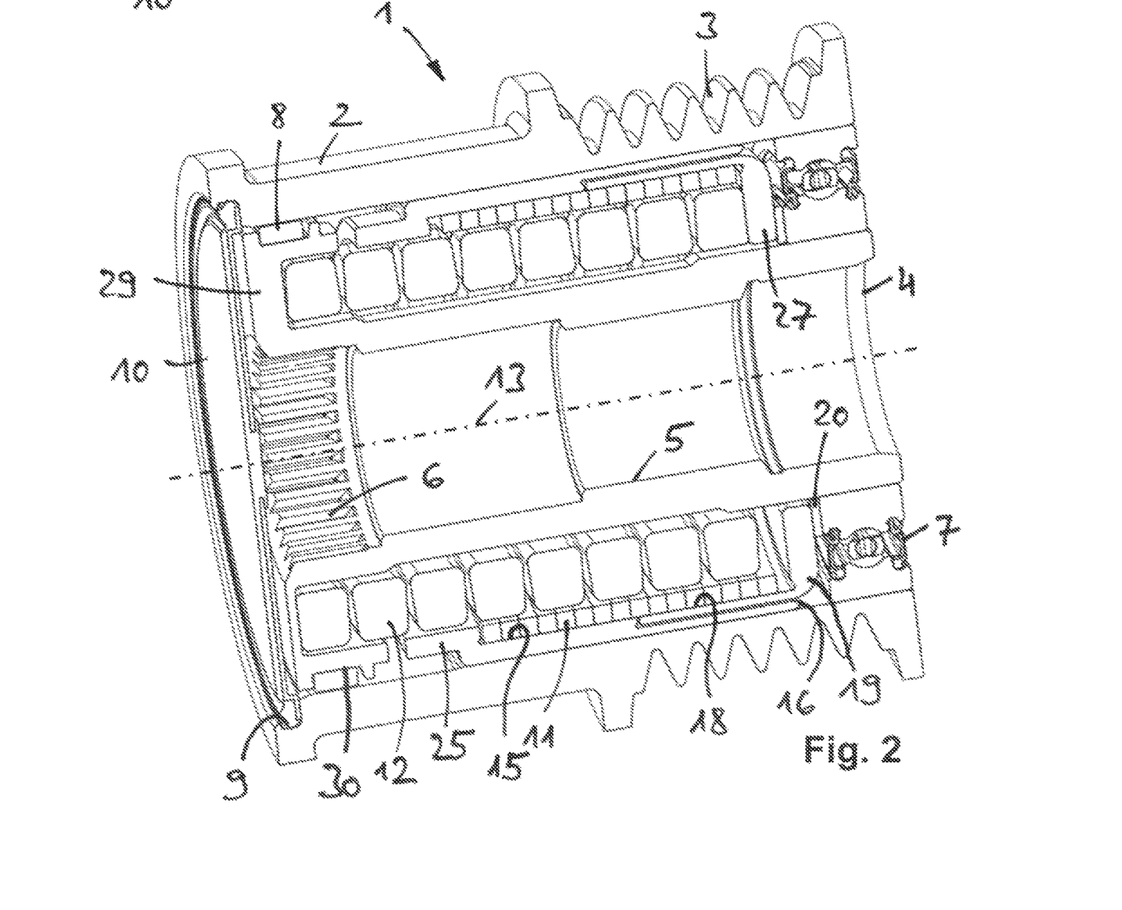
FIG. 2 the belt pulley decoupler in perspective longitudinal section.
Figure 3:
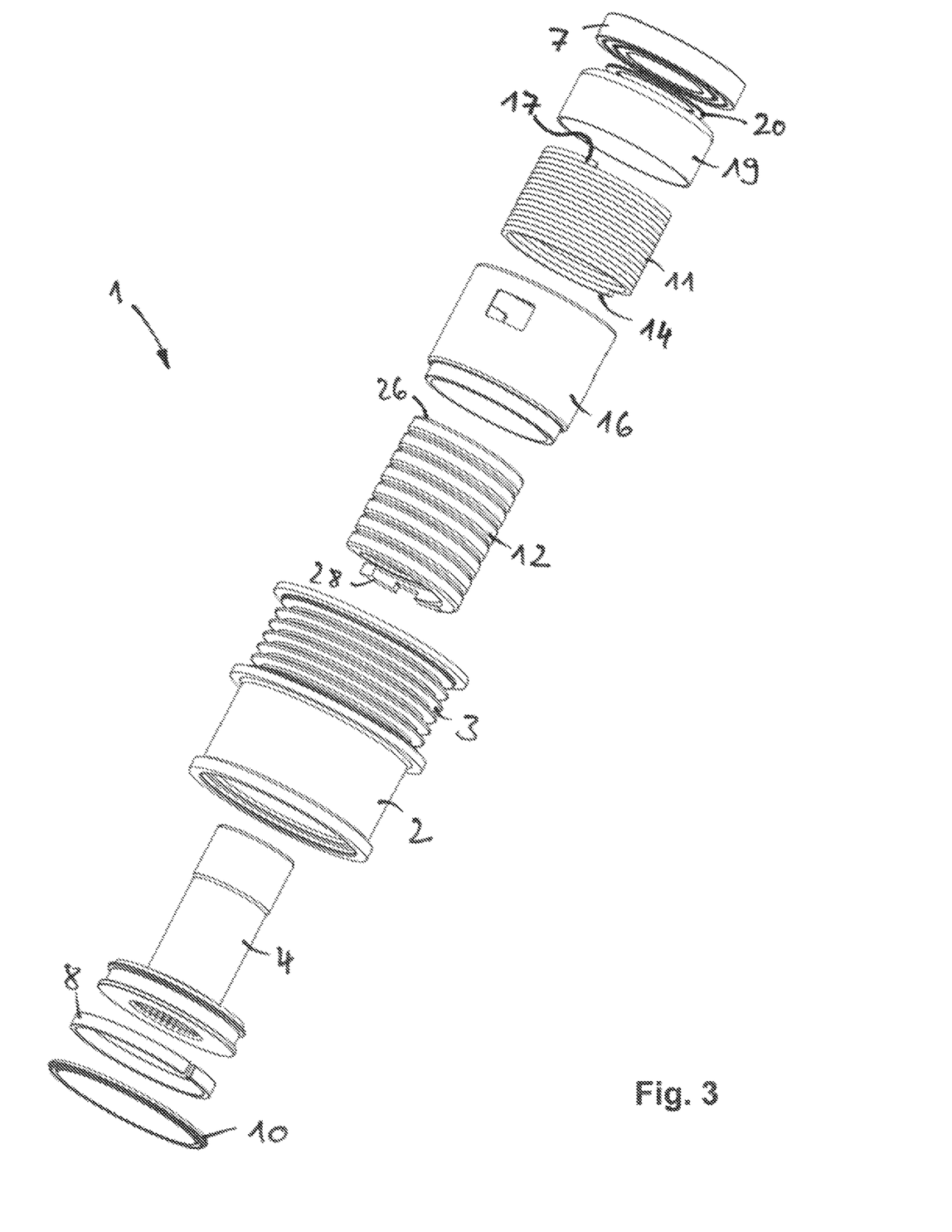
FIG. 3 the belt pulley decoupler in a perspective, exploded-view representation.

FIGS. 1 to 3 show the belt pulley decoupler 1, called decoupler 1 for short below, in different perspective representations, namely as a whole unit in FIG. 1, in a longitudinal section in FIG. 2, and as an exploded-view representation in FIG. 3. A hollow cylindrical belt pulley 2 whose outer lateral surface 3 wrapped around by the belt is profiled according to the poly-V shape of the belt is driven by the belt in the rotational direction shown in FIG. 1. The belt pulley 2 is supported so that it can rotate on a hub 4 that is screwed rigidly to the alternator shaft. For this purpose, the hub 4 has, in the middle section 5, a not-shown internal thread and on the front end section away from the alternator, internal serrations 6 as an engagement contour for the assembly tool. The radial and axial bearing of the belt pulley 2 on the hub 4 is realized on the alternator-side end by a roller bearing 7 and the radial bearing is realized on the end away from the alternator by a sliding bearing 8. The roller bearing 7 is a one-row ball bearing 7 that is sealed on two sides and the sliding bearing 8 is a radial bearing ring 8 made from polyamide that is in direct sliding contact with the inner diameter of the belt pulley 2.

The inner diameter of the belt pulley 2 is uniform in the entire axial range between the radial bearing ring 8 and the outer ring of the ball bearing 7 and therefore can be processed by turning in an especially simple and economical way. The belt pulley 4 has an extension 9 that is stepped in diameter only on the end away from the alternator and in which a protective cap 10 is snapped on after the decoupler 1 is screwed onto the alternator shaft.

The components that are essential for the function of the decoupler 1 are a one-way coupling 11 constructed as wrap-around band 11 and a decoupler spring 12 that is connected in series with the wrap-around band 11—with respect to the flow of drive torque from the belt pulley 2 to the hub 4—and that is constructed as helical torsion spring 12. The wrap-around band 11 and the helical torsion spring 12 extend coaxial relative to each other in the direction of the rotational axis 13 of the decoupler 1, wherein the wrap-around band 11 is arranged radially between the belt pulley 2 and the helical torsion spring 12 and consequently surrounds the helical torsion spring 12.

Both the wrap-around band 11 wound to the right and also the helical torsion spring 12 wound to the left are completely cylindrical and have flank-less ends on both sides, which widen the wrap-around band 11 or the helical torsion spring 12 in the radial direction during the transmission of the drive torque. Here, the first wrap-around band end 14 running on the side of the belt pulley 2 in the flow of drive torque is tensioned against the cylindrical inner lateral surface 15 of a first sleeve 16 that is locked in rotation in the belt pulley 2 by an interference fit assembly. The second wrap-around band end 17 running on the side of the helical torsion spring 12 in the flow of drive torque is tensioned against the cylindrical inner lateral surface 18 of a second sleeve 19 that is supported so that it can rotate in the first sleeve 16 and whose inner lateral surface 18 has the same diameter as the inner lateral surface 15.

The drive torque introduced by the belt pulley 2 is introduced into the helical torsion spring 12 only by static friction between the first sleeve 16 and the first wrap-around end 14 on one side and between the second wrap-around end 17 and the second sleeve 19 on the other side and transmitted from there to the hub 4. The belt pulley 2 is therefore an economically produced turned part that does not require heat treatment or a coating for the purpose of wear protection, but instead is provided with only corrosion protection. The axial forces of the helical torsion spring 12 acting on the second sleeve 19 are supported by a sliding bearing ring 20 on the inner ring of the ball bearing 7.

The wrap-around band 11 allows the alternator shaft and the hub 4 mounted on it to be overtaken with respect to the belt pulley 2 when the torque changes direction. In this state, the wrap-around band 11 contracts with respect to its (unloaded) initial diameter and slips in one or both sleeves 16, 19, wherein the torque that can be transmitted is reduced to the sliding friction torque between the two slipping contact partners.

Figures 4, 5, 6:
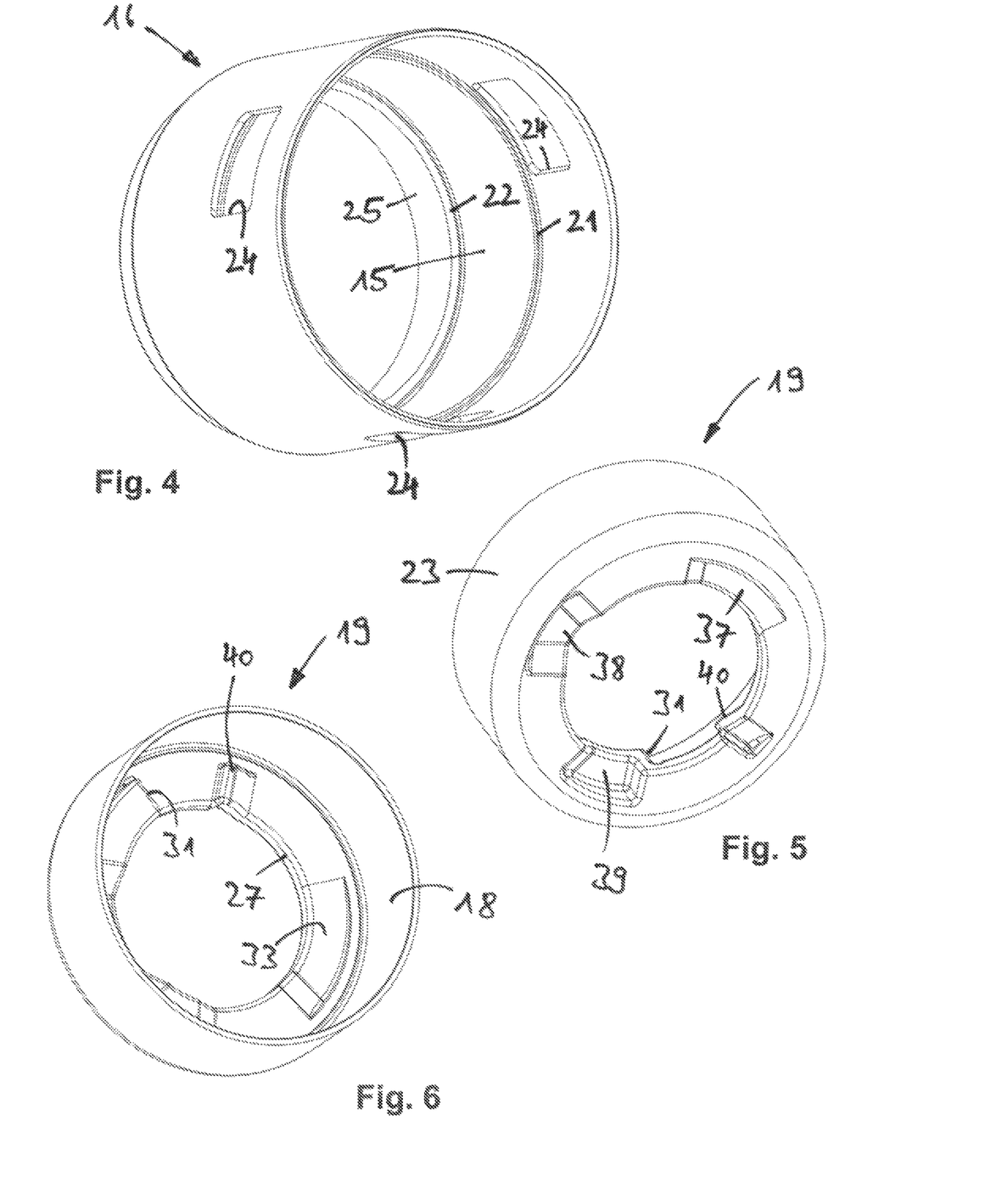
FIG. 4 the first sleeve of the belt pulley decoupler in a perspective detail representation.
FIG. 5 the second sleeve of the belt pulley decoupler in a perspective, outside detail representation.
FIG. 6 the second sleeve of the belt pulley decoupler in a perspective, inside detail representation.

The mutual rotational bearing and structural design of the two sleeves 16 and 19 is explained below in connection with FIGS. 4 to 6 that show the sleeves 16, 19 as details. Both sleeves 16, 19 are integrally formed sheet-metal parts hardened and/or coated for the purpose of wear resistance of its surface. The first sleeve 16 has two steps in its diameter, wherein the alternator-side first diameter step 21 is used on its end side as an axial stop for the second sleeve 19 and wherein the second diameter step 22 away from the alternator is used on its end side as an axial step for the wrap-around band 11. For a constant outer diameter, the first diameter step 21 is formed by an enlargement of the inner diameter in the area of the rotating bearing section in which the second sleeve 19 is held on its outer lateral surface 23 with a clearance fit. The rotating bearing section is penetrated close to the first diameter step 21 by three openings 24 arranged equally around the circumference for a tool that allows unhindered assembly of the wrap-around band 11 in the first sleeve 16. Here, the tool engages through the openings 24 and compresses the wrap-around band 11 in its diameter, in order to be able to be introduced into the first sleeve 16 centered and without contacting the inner lateral surface 15 past the first diameter step 21 and up to the second diameter step 22.

The end section 25 of the first sleeve 16 extending from the second diameter step 22 in the direction away from the alternator wraps around the helical torsion spring 12 with minimal radial clearance, in order to prevent, in this area, an impermissible widening of the helical torsion spring 12 under the effect of torque forces.

Figure 7:
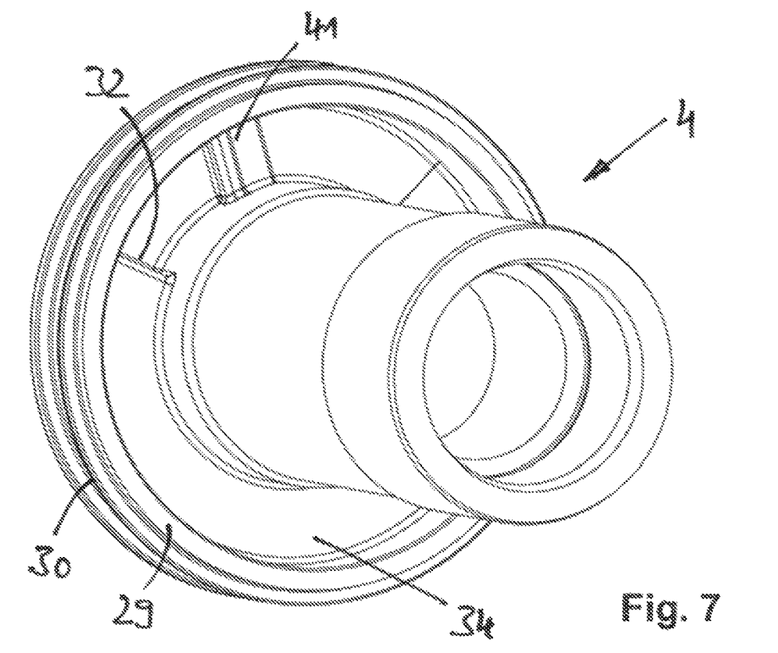
FIG. 7 the hub of the belt pulley decoupler in a perspective detail representation.
Figure 8:
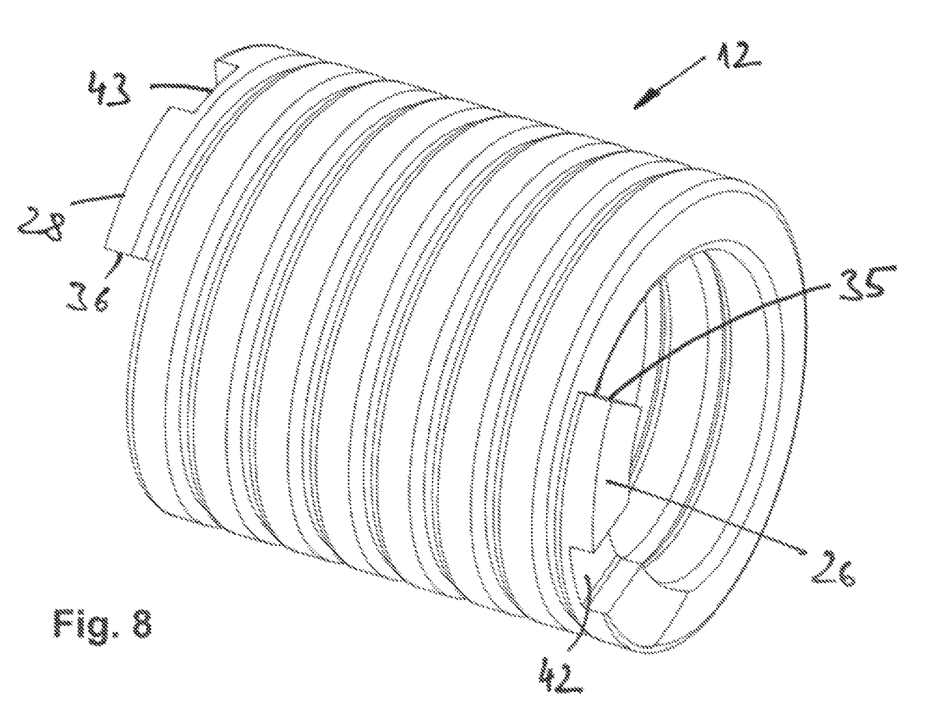
FIG. 8 the decoupler spring of the belt pulley decoupler in a perspective detail representation.

As also becomes clear in connection with FIGS. 7 and 8, the drive-side spring end 26 of the helical torsion spring 12 contacts a spring plate 27 locked in rotation with the second sleeve 19 and the driven-side spring end 28 contacts a spring plate 29 locked in rotation with the hub 4. The spring plate 27 locked in rotation with the second sleeve 19 is formed as a sheet formed part integral with the second sleeve 19. The spring plate 29 locked in rotation with the hub 4 is formed integrally with the hub 4 and has, on the outer lateral surface, a circumferential groove 30 that axially surrounds the radial bearing ring 8 running directly in the belt pulley 2 according to FIG. 2. The spring plates 27, 29 have, corresponding to the end-side contour of the helical torsion spring 12, spring contact surfaces 33 and 34 that rise with a ramp-like shape in the axial direction and spring back onto circumferential steps 31 and 32. The drive torque transmitted from the belt pulley 2 to the hub 4 is transmitted by the pressure contact between circumferential end sides 35 and 36 of the spring ends 26, 28 and the circumferential steps 31, 32 of the spring plates 27, 29. The spring contact surface 33 of the spring plate 27 is formed by circular arc-shaped formations 37 to 39 spaced apart from each other in the circumferential direction in the sheet formed part.

In the operating state of the decoupler 1 that is free from drive torque and in which the hub 4 overtakes the belt pulley 2, the sliding friction of the slipping wrap-around band 11 leads to the result that one or both spring ends 26, 28 of the helical torsion spring 12 are loaded with a friction torque that loads the spring ends 26, 28 in the circumferential direction of the axially rising spring contact surfaces 33, 34. This undesired ramp run-up of the helical torsion spring 12 is prevented by a so-called anti-ramp-up mechanism. Here, the spring ends 26, 28 form mutual rotational stops with the spring plates 27, 29, wherein each of these stops limits a relative rotation of the spring ends 26, 28 relative to the spring plates 27, 29, with this rotation increasing the circumferential distance between the circumferential end sides 35, 36 of the spring ends 26, 28 and the circumferential steps 31, 32 of the spring plates 27, 29. In other words, the rotational stops allow the transmission of tensile forces to the spring ends 26, 28, so that despite the sliding friction torque that is active then, the relative circumferential position of the spring ends 26, 28 relative to the spring plates 27, 29, as it is during pressure contact that transmits the drive torque, is not significantly changed even in the overtaking operation of the decoupler 1.

The rotational stops comprise rotating-locking contours according to the invention, which are formed, on the side of the spring plates 27, 29 by circumferential wedge-shaped projections 40, 41 rising in the direction of the steps 31, 32 and on the side of the spring ends 26, 28 by axial and, in the present case, rectangular recesses 42, 43. During the assembly of the decoupler 1, the wedge shape of the projections 40, 41 allows a circumferentially initially undirected placement of the spring ends 26, 28 on the spring plates 27, 29 and then its low-resistance relative rotation that decreases the circumferential distance between the end sides 35, 36 of the spring ends 26, 28 and the circumferential steps 31, 32 of the spring plates 27, 29 until the projections 40, 41 lock in the recesses 42, 43. The projection 40 of the spring plate 27 is formed like the formations 37 to 39 in the sheet formed part.

In principle, the rotating-locking contours could also be arranged alternatively in a reverse arrangement, wherein then, on one side, the projections are part of the spring ends and rise in a wedge shape away from the circumferential steps 31, 32 of the spring plates and on the other hand, the spring plates are recessed accordingly.

FIGS. 9 to 12 show a decoupler 1' with rotating support not according to the invention for the first sleeve 16' and the second sleeve 19' that is supported so that it can rotate, in this case, next to the first sleeve 16' and directly in the belt pulley 2'. The figures nevertheless show structural details that can be used alternatively in the decoupler 1 according to the invention in line with FIGS. 1 to 8.

Figures 9, 10, 11, 12:
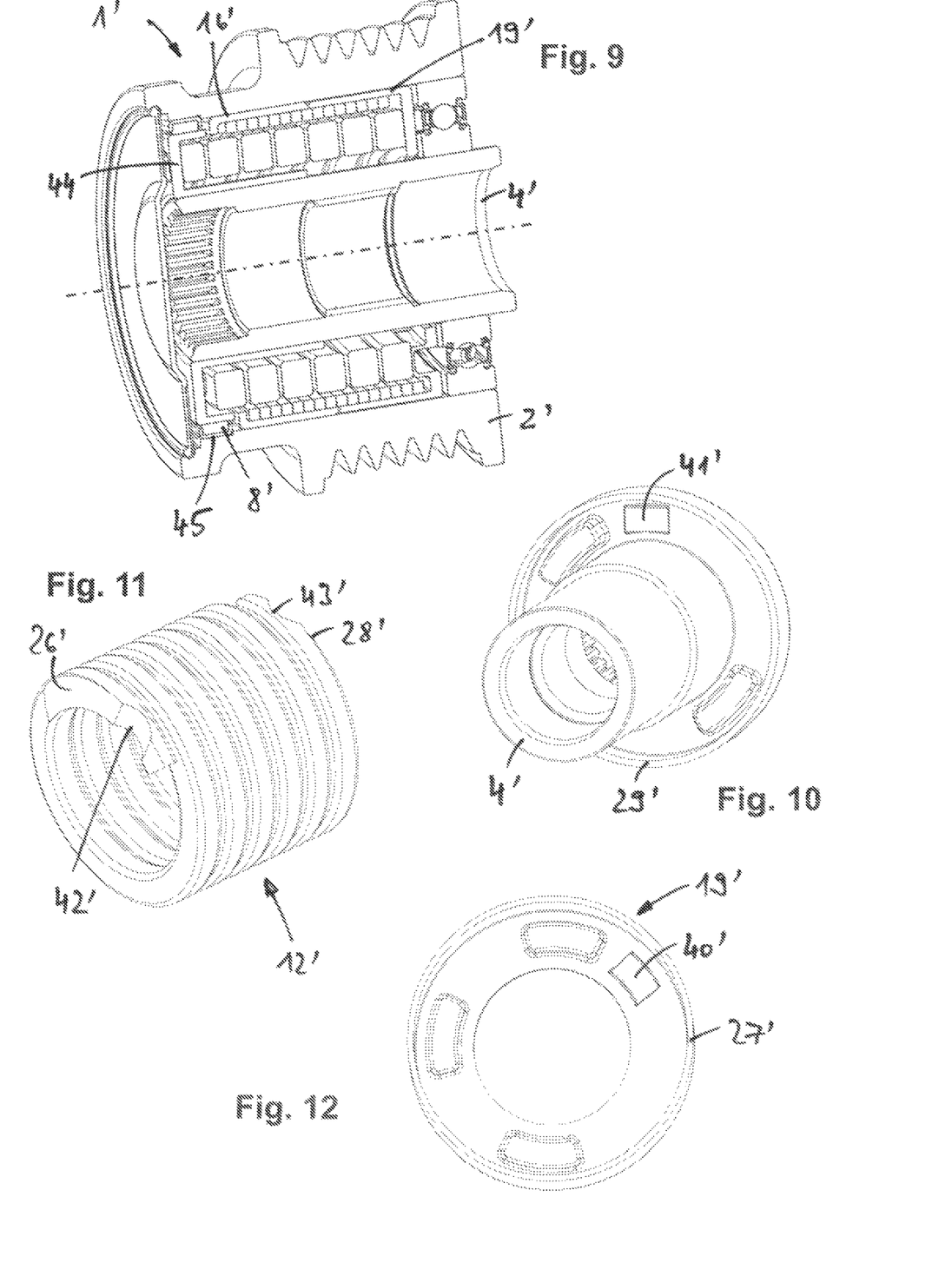
FIG. 9 a belt pulley decoupler with rotating bearing of the sleeves not according to the invention in a perspective longitudinal section.
FIG. 10 the hub of the belt pulley decoupler according to FIG. 9 in a perspective detail representation.
FIG. 11 the decoupler spring of the belt pulley decoupler according to FIG. 9 in a perspective detail representation.
FIG. 12 the second sleeve of the belt pulley decoupler according to FIG. 9 in a perspective, inside detail representation.

The hub 4' has two parts with a base body and a sheet sleeve 44 pressed on this base body for forming the spring plate 29' locked in rotation with the hub 4'. This allows the hub 4' to be produced economically as a turned part with constant outer diameter. Relative to the circumferential groove 30 on the outer lateral surface of the one-part hub 4, in this design, the axial enclosure of the radial bearing ring 8' is not realized on the side of the hub 4', but instead by a retaining ring 45 that is pressed into the belt pulley 2' and is formed with a U-profile as a sheet formed part.

Another detail relates to the contour of the anti-ramp-up mechanism. The rotational locking contours are not wedge-shaped in this construction, but instead circumferentially symmetric with circular segment-shaped projections 40', 41' on the spring plates 27', 29' and circular segment-shaped recesses 42', 43' in the spring ends 26', 28' of the helical torsion spring 12'.

LIST OF REFERENCE SYMBOLS

1 Belt pulley decoupler/decoupler
2 Belt pulley
3 Outer lateral surface of the belt pulley
4 Hub
5 Center section of the hub
6 Internal serrations
7 Roller bearing/ball bearing
8 Sliding bearing/radial bearing ring
9 Extension
10 Protective cap
11 One-way coupling/wrap-around band
12 Decoupler spring/helical torsion spring
13 Rotational axis
14 First wrap-around band end
15 Inner lateral surface of the first sleeve
16 First sleeve
17 Second wrap-around band end
18 Inner lateral surface of the second sleeve
19 Second sleeve
20 Sliding bearing ring
21 First diameter step
22 Second diameter step
23 Outer lateral surface of the second sleeve
24 Opening
25 End section of the first sleeve
26 Drive-side spring end
27 Spring plate
28 Driven-side spring end
29 Spring plate
30 Circumferential groove
31 Step
32 Step
33 Spring contact surface
34 Spring contact surface
35 End side of the spring end
36 End side of the spring end
37 Formation
38 Formation
39 Formation
40 Wedge-shaped projection
41 Wedge-shaped projection
42 Axial recess
43 Axial recess
44 Sheet sleeve
45 Retaining ring

The invention claimed is:

1. A belt pulley decoupler for transmitting a drive torque from belts of an auxiliary unit belt drive to a shaft of one of the auxiliary units, the belt pulley decoupler comprising:
   a belt pulley,
   a hub adapted to be mounted on the shaft,
   a series circuit arranged in a flow of drive torque between the belt pulley and the hub including a decoupler spring and a wrap-around band having first and second wrap-around band ends that extends in a direction of a rotational axis of the belt pulley decoupler and is arranged radially between the belt pulley and the decoupler spring,
   a first sleeve locked in rotation in the belt pulley, the first and second wrap-around band ends widen radially while transmitting the drive torque, the first wrap-around band end extending in a flow direction of the drive torque on a side of the belt pulley is tensioned against an inner lateral surface of the first sleeve,
   a second sleeve rotatably supported in the first sleeve, the second wrap-around band end extending in the flow direction of the drive torque on a side of the decoupler spring is tensioned against an inner lateral surface of the second sleeve, and the first sleeve has circumferentially distributed openings for mounting of the wrap-around band in the first sleeve in a rotational bearing section for the second sleeve.

2. The belt pulley decoupler according to claim 1, wherein the first sleeve and the second sleeve are formed sheet metal parts.

3. A belt pulley decoupler for transmitting a drive torque from belts of an auxiliary unit belt drive to a shaft of one of the auxiliary units, the belt pulley decoupler comprising:
a belt pulley,
a hub adapted to be mounted on the shaft,
a series circuit arranged in a flow of drive torque between the belt pulley and the hub including a decoupler spring and a wrap-around band having first and second wrap-around band ends that extends in a direction of a rotational axis of the belt pulley decoupler and is arranged radially between the belt pulley and the decoupler spring,
a first sleeve locked in rotation in the belt pulley, the first and second wrap-around band ends widen radially while transmitting the drive torque, the first wrap-around band end extending in a flow direction of the drive torque on a side of the belt pulley is tensioned against an inner lateral surface of the first sleeve,
a second sleeve rotatably supported in the first sleeve, the second wrap-around band end extending in the flow direction of the drive torque on a side of the decoupler spring is tensioned against an inner lateral surface of the second sleeve, the first sleeve is a unitary part including a first diameter step integrally formed in one piece with the first sleeve that provides an axial stop for the second sleeve and a second diameter step integrally formed in one piece with the first sleeve that provides an axial stop for the wrap-around band.

4. The belt pulley decoupler according to claim 1, wherein the decoupler spring is a helical torsion spring that extends in the direction of the rotational axis of the belt pulley decoupler, and includes a drive-side spring end that contacts a first spring plate locked in rotation with the second sleeve and includes a driven-side spring end that contacts a second spring plate locked in rotation with the hub and transmits the drive torque by a pressure contact between circumferential end sides of the drive-side and driven-side spring ends and circumferential steps of the first and second spring plates, the drive-side and driven-side spring ends form mutual rotational stops with the first and second spring plates, said rotational stops limit a relative rotation of the drive-side and driven-side spring ends relative to the first and second spring plates, respectively, increasing a circumferential distance between the circumferential end sides of the drive-side and driven-side spring ends and the circumferential steps of the first and second spring plates.

5. The belt pulley decoupler according to claim 4, wherein the rotational stops comprise rotational locking contours that allow, up to locking, a relative rotation of the drive-side and driven-side spring ends relative to the first and second spring plates decreasing a circumferential distance between the circumferential end sides of the drive-side and driven-side spring ends and the circumferential steps of the drive-side and driven-side spring plates.

6. The belt pulley decoupler according to claim 5, wherein the rotational locking contours are formed on a side of each of the spring plates by circumferential, wedge-shaped, rising projections and the spring drive-side and driven-side spring ends include axial recesses, in which the projections are locked.

7. The belt pulley decoupler according to claim 6, wherein the second spring plate that is locked in rotation with the hub is formed integrally with the hub and has an outer lateral surface with a circumferential groove, and the hub is rotatably supported by a sliding bearing ring arranged in the circumferential groove for rotation in the belt pulley.

8. The belt pulley decoupler according to claim 7, wherein the first spring plate that is locked in rotation with the second sleeve is formed integrally with the second sleeve as a formed sheet metal part.

9. The belt pulley decoupler according to claim 8, the formed sheet metal part has an axial, ramp-shaped rising spring contact surface that is formed by circular arc-shaped formations that are spaced apart from each other circumferentially in the formed sheet metal part.

10. A belt pulley decoupler for transmitting a drive torque, the belt pulley decoupler comprising:
a belt pulley,
a hub adapted to be mounted on a shaft,
a decoupler spring located around the hub and extending in an axial direction,
a wrap-around band having first and second wrap-around band ends that extends in the axial direction and is arranged radially between the belt pulley and the decoupler spring,
the first and second wrap-around band ends widen radially while transmitting the drive torque,
a first sleeve that is locked in rotation in the belt pulley and having an inner lateral surface against which the first wrap-around band end is tensioned,
a second sleeve rotatably supported in the first sleeve and having a second sleeve inner lateral surface against which the second wrap-around band end is tensioned, and
the first sleeve has circumferentially distributed openings to access the wrap-around band located in a rotational bearing section for the second sleeve in the first sleeve.

11. The belt pulley decoupler according to claim 10, wherein the decoupler spring and the wrap-around band are coaxially arranged coil springs.

12. The belt pulley decoupler according to claim 10, wherein the first sleeve and the second sleeve are formed sheet metal parts.

13. The belt pulley decoupler according to claim 10, further comprising a first spring plate locked in rotation with the second sleeve and a second spring plate locked in rotation with the hub, the first and second spring plates including respective circumferential steps, the decoupler spring includes a drive-side spring end that contacts the first spring plate and a driven-side spring end that contacts the second spring plate to transmit the drive torque by a pressure contact between circumferential end sides of the drive-side and driven-side spring ends and the respective circumferential steps.

14. The belt pulley decoupler according to claim 13, wherein the drive-side and driven-side spring ends form mutual rotational stops with the first and second spring plates, said rotational stops limit a relative rotation of the drive-side and driven-side spring ends relative to the first and second spring plates, respectively, increasing a circumferential distance between the circumferential end sides of the drive-side and driven-side spring ends and the circumferential steps of the first and second spring plates.

15. The belt pulley decoupler according to claim 14, wherein the rotational stops comprise rotational locking contours that allow, up to locking, a relative rotation of the drive-side and driven-side spring ends relative to the first and second spring plates.

16. A belt pulley decoupler for transmitting a drive torque, the belt pulley decoupler comprising:
- a belt pulley,
- a hub adapted to be mounted on a shaft,
- a decoupler spring located around the hub and extending in an axial direction,
- a wrap-around band having first and second wrap-around band ends that extends in the axial direction and is arranged radially between the belt pulley and the decoupler spring,
- the first and second wrap-around band ends widen radially while transmitting the drive torque,
- a first sleeve that is locked in rotation in the belt pulley and having an inner lateral surface against which the first wrap-around band end is tensioned,
- a second sleeve rotatably supported in the first sleeve and having a second sleeve inner lateral surface against which the second wrap-around band end is tensioned,
- a first spring plate locked in rotation with the second sleeve and a second spring plate locked in rotation with the hub, the first and second spring plates including respective circumferential steps, the decoupler spring includes a drive-side spring end that contacts the first spring plate and a driven-side spring end that contacts the second spring plate to transmit the drive torque by a pressure contact between circumferential end sides of the drive-side and driven-side spring ends and the respective circumferential steps, and
- the first spring plate is formed integrally in one piece with the second sleeve.

17. The belt pulley decoupler according to claim 14, wherein the second spring plate is formed integrally with the hub.

* * * * *